US012437955B2

(12) United States Patent
Qian

(10) Patent No.: US 12,437,955 B2
(45) Date of Patent: *Oct. 7, 2025

(54) METHOD OF FORMING FIELD EMISSION CATHODES BY CO-ELECTRODEPOSITION

(71) Applicant: NCX Corporation, Raleigh, NC (US)

(72) Inventor: Cheng Qian, Cary, NC (US)

(73) Assignee: NCX Corporation, Raleigh, NC (US)

( * ) Notice: Subject to any disclaimer, the term of this patent is extended or adjusted under 35 U.S.C. 154(b) by 242 days.

This patent is subject to a terminal disclaimer.

(21) Appl. No.: 18/247,298

(22) PCT Filed: Sep. 29, 2021

(86) PCT No.: PCT/IB2021/058949
§ 371 (c)(1),
(2) Date: Mar. 30, 2023

(87) PCT Pub. No.: WO2022/070103
PCT Pub. Date: Apr. 7, 2022

(65) Prior Publication Data
US 2023/0411104 A1    Dec. 21, 2023

Related U.S. Application Data

(60) Provisional application No. 63/085,542, filed on Sep. 30, 2020.

(51) Int. Cl.
H01J 9/02        (2006.01)
H01J 1/304       (2006.01)
C01B 32/174      (2017.01)
C25D 13/02       (2006.01)

(52) U.S. Cl.
CPC ............ *H01J 9/025* (2013.01); *H01J 1/3048* (2013.01); *C01B 32/174* (2017.08); *C25D 13/02* (2013.01); *H01J 2201/30469* (2013.01)

(58) Field of Classification Search
CPC ............... H01J 1/3048; H01J 9/025; H01J 2201/30469; C01B 32/174; C25D 13/02
USPC .......................................................... 427/77
See application file for complete search history.

(56) References Cited

U.S. PATENT DOCUMENTS

| 8,901,547 | B2* | 12/2014 | Facchetti | ............... H10K 50/30 257/40 |
| 8,921,473 | B1* | 12/2014 | Hyman | ..................... C08K 3/04 524/495 |
| 9,099,670 | B2* | 8/2015 | Facchetti | ............. H10K 50/805 |
| 9,437,842 | B2* | 9/2016 | Facchetti | ............... H10K 50/15 |
| 11,929,249 | B2* | 3/2024 | Qian | ......... H01J 9/025 |
| 2004/0055892 | A1* | 3/2004 | Oh | ......... C25D 15/00 205/109 |

(Continued)

FOREIGN PATENT DOCUMENTS

| CN | 103346051 | 10/2013 |
| JP | 2006209973 | 8/2006 |

*Primary Examiner* — Brian K Talbot
(74) *Attorney, Agent, or Firm* — Womble Bond Dickinson (US) LLP

(57) ABSTRACT

A method for fabricating an electron field emission cathode, the field emission cathode including a substrate having a field emission layer engaged therewith, where the field emission layer incorporates modified carbon nanotubes and a matrix material to improve field emission characteristics of the cathode and field emission cathode devices implementing such cathodes.

24 Claims, 3 Drawing Sheets

(56) References Cited

U.S. PATENT DOCUMENTS

Figure 1:
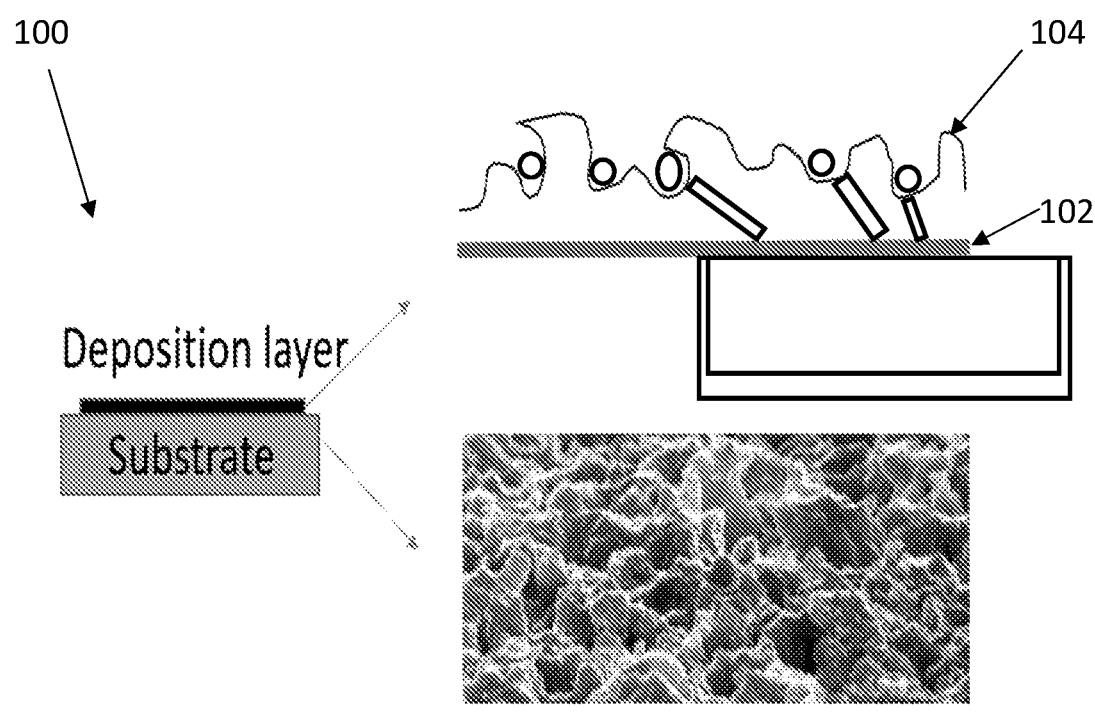

| | | | |
|---|---|---|---|
| 2004/0070326 A1* | 4/2004 | Mao | H01J 1/304 |
| | | | 313/311 |
| 2006/0057927 A1* | 3/2006 | Kang | B82Y 10/00 |
| | | | 445/46 |
| 2009/0078914 A1* | 3/2009 | Lu | C25D 13/02 |
| | | | 252/502 |
| 2014/0054613 A1* | 2/2014 | Facchetti | H10K 50/16 |
| | | | 257/79 |
| 2017/0237043 A1* | 8/2017 | Facchetti | H10K 59/12 |
| | | | 257/40 |

* cited by examiner

SEM image of deposition layer

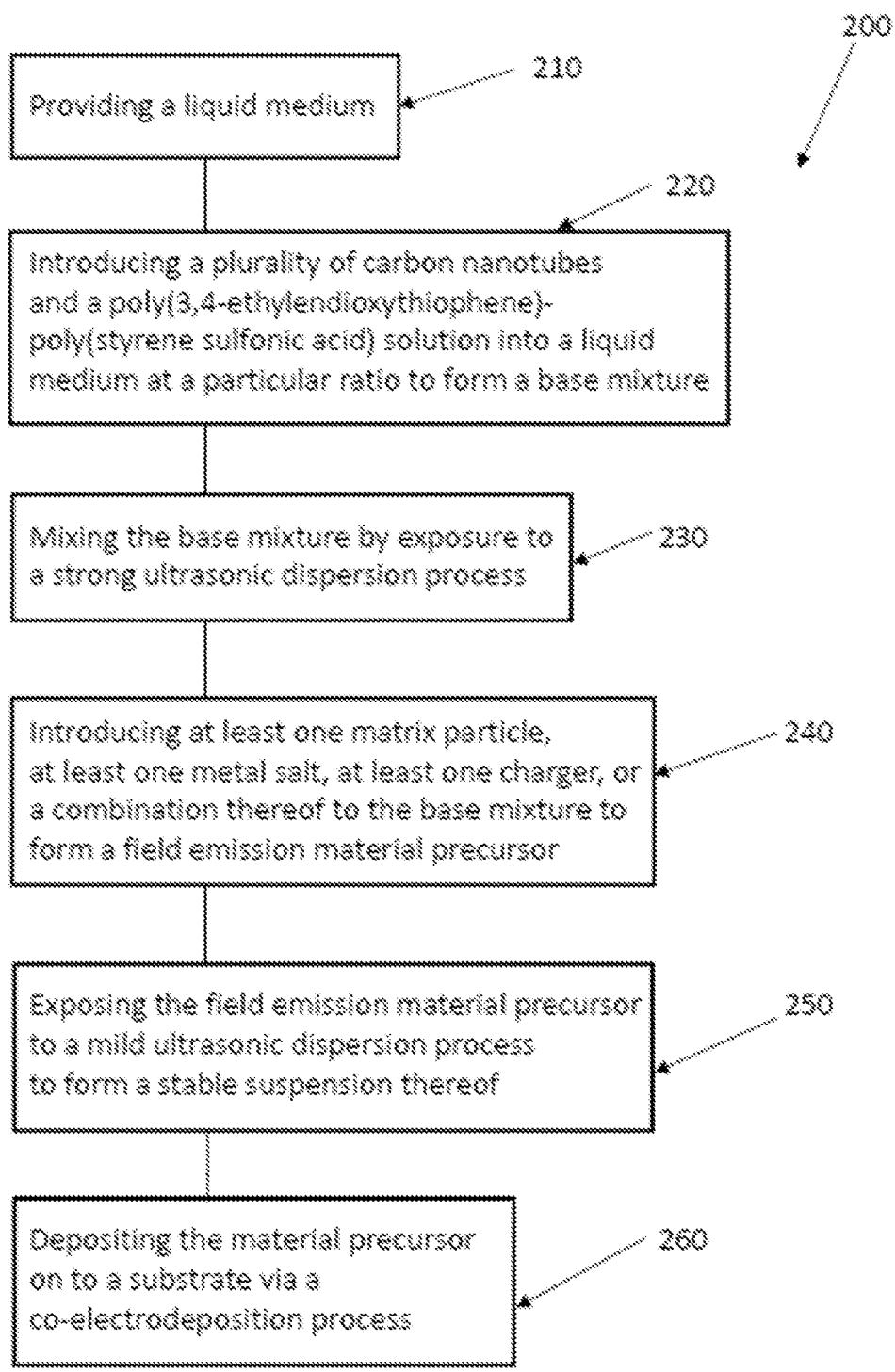

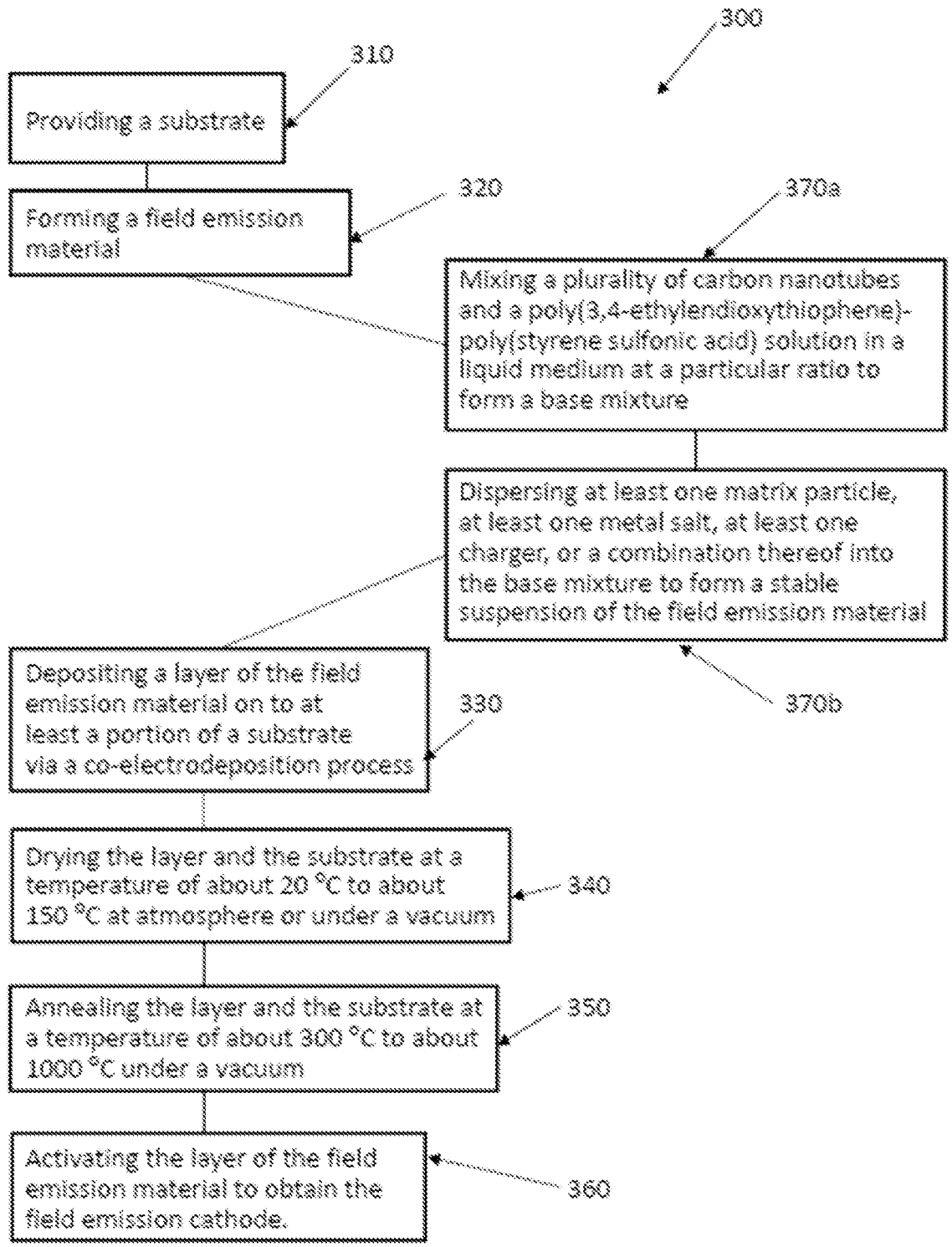

METHOD OF FORMING FIELD EMISSION CATHODES BY CO-ELECTRODEPOSITION

CROSS-REFERENCE TO RELATED APPLICATIONS

This application is a national stage filing under 35 U.S.C. 371 of PCT/IB2021/058949, filed Sep. 29, 2021, which International Application was published by the International Bureau in English on Apr. 7, 2022, as WO 2022/070103, and application claims priority from U.S. Application No. 63/085,542, filed on Sep. 30, 2020, which applications are hereby incorporated in their entirety by reference in this application.

BACKGROUND

Field of the Disclosure

The present application relates to methods of fabricating field emission cathode devices and, more particularly, to methods of forming field emission cathodes incorporating modified carbon nanotubes and a matrix material into a field emission matrix material to improve field emission characteristics of the cathode and field emission cathode devices implementing such cathodes.

Description of Related Art

A field emission cathode device generally includes a cathode substrate (usually comprised of a metal or other conducting material such as an alloy, conductive glass, metalized ceramics, doped silicon), a layer of a field emission material (e.g., nanotubes, nanowires, graphene) disposed on the substrate, and, if necessary, an additional layer of an adhesion material disposed between the substrate and the field emission material. Some typical applications of a field emission cathode device include, for example, electronics operable in a vacuum environment, field emission displays, and X-ray tubes.

Carbon nanotubes may be used in the fabrication of cold field emission cathodes. However, the carbon nanotubes do not typically disperse well and/or are not stable during current electrophoresis processes, resulting in poor uniformity of the emitters on the surface of the cathodes and significant batch to batch variation of the cathodes.

Thus, there is a need for a process for improving the distribution of carbon nanotubes within a field emission matrix material to obtain field emitter cathodes having a high density of emitters distributed on their surfaces with a high uniformity, thereby improving the field emission characteristics of the cathodes, such as emission current, turn on voltage and emission lifetime.

SUMMARY OF THE DISCLOSURE

The above and other needs are met by aspects of the present disclosure which includes, without limitation, the following example embodiments and, in one particular aspect, a method of forming a field emission cathode, where the method includes forming a field emission material by mixing a plurality of carbon nanotubes and a poly(3,4-ethylendioxythiophene)-poly(styrene sulfonic acid) solution in water at a particular ratio to form a base mixture, exposing the base mixture to a strong ultrasonic dispersion method, introducing at least one matrix particle, at least one metal salt, at least one charger, or a combination thereof to the base mixture to form a field emission material mixture (i.e., a modified base mixture), and exposing the field emission material mixture to a mild ultrasonic dispersion method to form a stable suspension of the field emission material; depositing a layer of the stable suspension of the field emission material on to at least a portion of a substrate via a co-electrodeposition process; drying the layer and the substrate at a temperature of about 20° C. to about 150° C. at atmosphere or under a vacuum; annealing the layer and the substrate at a temperature of about 300° C. to about 1000° C. under a vacuum; and activating the layer of the field emission material to obtain the field emission cathode.

Another example aspect provides a method of forming a field emission material precursor, where the method includes introducing a plurality of carbon nanotubes and a poly(3,4-ethylendioxythiophene)-poly(styrene sulfonic acid) solution into a liquid medium at a particular ratio; mixing the plurality of carbon nanotubes and the a poly(3,4-ethylendioxythiophene)-poly(styrene sulfonic acid) solution via a strong ultrasonic dispersion method to form a base mixture; introducing at least one matrix particle, at least one metal salt, at least one charger, or a combination thereof into the base mixture; and exposing the modified base mixture comprising the at least one matrix particle, the at least one metal salt, and the at least one charger to a mild ultrasonic dispersion method to form a stable suspension of the field emission material.

Another example aspect provides another method of forming a field emission cathode, where the method includes depositing a layer of the field emission material on to at least a portion of a substrate via a co-electrodeposition process, drying the layer and the substrate at a temperature of about 20° C. to about 150° C. at atmosphere or under a vacuum, annealing the layer and the substrate at a temperature of about 300° C. to about 1000° C. under a vacuum, and activating the layer of the field emission material to obtain the field emission cathode.

Yet another example aspect provides for a field emission cathode device, where the cathode is fabricated in accordance with any one of the proceeding aspects to obtain a cathode device. The cathode has an improved density and uniformity of the field emitters on the surface of the cathode, thereby resulting in a cathode device with improved field emission characteristics, such as high emission current, low turn on voltage and longer emission lifetime.

The present disclosure thus includes, without limitation, the following example embodiments:

Example Embodiment 1: A method of forming a field emission cathode, comprising forming a field emission material, comprising mixing a plurality of carbon nanotubes and a poly(3,4-ethylendioxythiophene)-poly(styrene sulfonic acid) (PEDOT:PSS) solution in water at a particular ratio to form a base mixture; exposing the base mixture to an ultrasonic dispersion process at a power of greater than 1 $W/cm^2$ and at a frequency of about 20-50 kHz; introducing at least one matrix particle, at least one metal salt, at least one charger, or a combination thereof to the base mixture to form a field emission material precursor; and exposing the field emission material precursor to an ultrasonic dispersion process at a power of less than 1 $W/cm^2$ and at a frequency of greater than 50 kHz to form a stable suspension of the field emission material precursor; depositing a layer of the field emission material precursor on to at least a portion of a substrate via a co-electrodeposition process; drying the layer and the substrate at a temperature of about 20° C. to about 150° C. at atmosphere or under a vacuum; annealing the layer and the substrate at a temperature of about 300° C.

to about 1000° C. under a vacuum; and activating the layer of the field emission material to obtain the field emission cathode.

Example Embodiment 2: The method of any preceding example embodiment, or combinations thereof, wherein mixing the plurality of carbon nanotubes and the PEDOT:PSS solution comprises mixing the plurality of carbon nanotubes and the PEDOT:PSS solution such that the particular ratio of carbon nanotubes to PEDOT:PSS solution ranges from 10:1 to 1:10.

Example Embodiment 3: The method of any preceding example embodiment, or combinations thereof, wherein introducing at least one matrix particle comprises introducing at least one glass particle.

Example Embodiment 4: The method of any preceding example embodiment, or combinations thereof, wherein introducing at least one glass particle comprises introducing at least one glass particle having a diameter of between about 100 nm to about 3 micrometers.

Example Embodiment 5: The method of any preceding example embodiment, or combinations thereof, wherein introducing at least one matrix particle comprises introducing at least one matrix particle such that the at least one matrix particle is dispersed in the base mixture at up to 10 wt % of total liquid medium of the field emission material precursor.

Example Embodiment 6: The method of any preceding example embodiment, or combinations thereof, wherein introducing at least one matrix particle comprises introducing at least one metal salt selected from the group consisting of a silver salt, a copper salt, a platinum salt, a bismuth salt, a tungsten salt, a stibium salt, a gold salt, or combinations thereof.

Example Embodiment 7: The method of any preceding example embodiment, or combinations thereof, wherein introducing at least one matrix particle comprises introducing at least one metal salt such that the at least one metal salt is dispersed in the base mixture at up to 10 wt % of total liquid medium of the field emission material precursor.

Example Embodiment 8: The method of any preceding example embodiment, or combinations thereof, wherein introducing at least one matrix particle comprises introducing at least one charger selected from the group consisting of a lithium salt, a sodium salt, a calcium salt, a magnesium salt, an aluminum salt, a zinc salt, an iron salt, a cobalt salt, a nickel salt, an ammonium salt, or combinations thereof.

Example Embodiment 9: The method of any preceding example embodiment, or combinations thereof, wherein introducing at least one matrix particle comprises introducing at least one charger such that the at least one charger is dispersed in the base mixture at up to 1 wt % of total liquid medium of the field emission material precursor.

Example Embodiment 10: The method of any preceding example embodiment, or combinations thereof, wherein depositing the layer of the field emission material precursor depositing the layer of the field emission material precursor on to the at least a portion of the substrate comprising a metal, an alloy, a glass, or a ceramic.

Example Embodiment 11: The method of any preceding example embodiment, or combinations thereof, wherein activating the layer of the field emission material comprises applying an adhesive tape on to a surface of the layer of the field emission material; and removing the adhesive tape from the layer of the field emission material.

Example Embodiment 12: The method of any preceding example embodiment, or combinations thereof, wherein activating the layer of the field emission material comprises applying a curable adhesive on to a surface of the layer of the field emission material; exposing the adhesive to a heat source or an ultraviolet light to cure the adhesive and form a layer of an adhesive film; and removing the layer of adhesive film from the layer of the field emission material.

Example Embodiment 13: A method of forming a field emission material precursor, comprising introducing a plurality of carbon nanotubes into a liquid medium; introducing a PEDOT:PSS solution into the liquid medium at a particular ratio to the plurality of carbon nanotubes; mixing the plurality of carbon nanotubes and the PEDOT:PSS solution via an ultrasonic dispersion process at a power of greater than 1 W/cm$^2$ and at a frequency of about 20-50 kHz to form a base mixture; introducing at least one matrix particle, at least one metal salt, at least one charger, or a combination thereof in the base mixture; and exposing the base mixture comprising the at least one matrix particle, the at least one metal salt, and the at least one charger to an ultrasonic dispersion process at a power of less than 1 W/cm$^2$ and at a frequency of greater than 50 kHz to form a stable suspension of a field emission material precursor.

Example Embodiment 14: The method of any preceding example embodiment, or combinations thereof, wherein introducing the PEDOT:PSS solution into the liquid medium comprises introducing a PEDOT:PSS solution into the water with the particular ratio of carbon nanotubes to PEDOT:PSS solution ranging from 10:1 to 1:10.

Example Embodiment 15: The method of any preceding example embodiment, or combinations thereof, comprising depositing the field emission material precursor on to a substrate via a co-electrodeposition process.

Example Embodiment 16: The method of any preceding example embodiment, or combinations thereof, wherein introducing at least one matrix particle comprises introducing at least one glass particle.

Example Embodiment 17: The method of any preceding example embodiment, or combinations thereof, wherein introducing at least one matrix particle comprises introducing at least one matrix particle such that the at least one matrix particle is dispersed in the base mixture up to 10 wt % of total liquid medium of the field emission material precursor.

Example Embodiment 18: The method of any preceding example embodiment, or combinations thereof, wherein introducing at least one matrix particle comprises introducing at least one metal salt selected from the group consisting of a silver salt, a copper salt, a platinum salt, a bismuth salt, a tungsten salt, a stibium salt, a gold salt, or combinations thereof.

Example Embodiment 19: The method of any preceding example embodiment, or combinations thereof, wherein introducing at least one matrix particle comprises introducing at least one metal salt such that the at least one metal salt is dispersed in the base mixture at up to 10 wt % of total liquid medium of the field emission precursor material.

Example Embodiment 20: The method of any preceding example embodiment, or combinations thereof, wherein introducing at least one matrix particle comprises introducing at least one charger selected from the group consisting of a lithium salt, a sodium salt, a calcium salt, a magnesium salt, an aluminum salt, a zinc salt, an iron salt, a cobalt salt, a nickel salt, an ammonium salt, or combinations thereof.

Example Embodiment 21: The method of any preceding example embodiment, or combinations thereof, wherein introducing at least one matrix particle comprises introducing at least one charger such that the at least one charger is dispersed in the base mixture at up to 1 wt % of total liquid medium of the field emission precursor material.

Example Embodiment 22: A method of forming a field emission cathode, comprising depositing a layer of the field emission material of the method of any preceding example embodiment, or combinations thereof, on to at least a portion of a substrate via a co-electrodeposition process; drying the layer and the substrate at a temperature of about 20° C. to about 150° C. at atmosphere or under a vacuum; annealing the layer and the substrate at a temperature of about 300° C. to about 1000° C. under a vacuum; and activating the layer of the field emission material to obtain the field emission cathode.

Example Embodiment 23: A field emission cathode device comprising a cathode fabricated in accordance with the method of any preceding example embodiment, or combinations thereof.

These and other features, aspects, and advantages of the present disclosure will be apparent from a reading of the following detailed description together with the accompanying drawings, which are briefly described below. The present disclosure includes any combination of two, three, four, or more features or elements set forth in this disclosure, regardless of whether such features or elements are expressly combined or otherwise recited in a specific embodiment description herein. This disclosure is intended to be read holistically such that any separable features or elements of the disclosure, in any of its aspects and embodiments, should be viewed as intended, namely to be combinable, unless the context of the disclosure clearly dictates otherwise.

It will be appreciated that the summary herein is provided merely for purposes of summarizing some example aspects so as to provide a basic understanding of the disclosure. As such, it will be appreciated that the above described example aspects are merely examples and should not be construed to narrow the scope or spirit of the disclosure in any way. It will be appreciated that the scope of the disclosure encompasses many potential aspects, some of which will be further described below, in addition to those herein summarized. Further, other aspects and advantages of such aspects disclosed herein will become apparent from the following detailed description taken in conjunction with the accompanying drawings which illustrate, by way of example, the principles of the described aspects.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 schematically illustrates an example of a field emission cathode and the nature of the field emission material deposition layer engaged with the cathode substrate, according to one or more aspects of the present disclosure;

FIG. 2 illustrates one example of a method of forming a field emission material precursor, according to one or more aspects of the present disclosure; and FIG. 3 illustrates one example of a method of forming a field emission cathode, according to one or more aspects of the present disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 illustrates one example of a field emission cathode 100 that includes a substrate 102 and a layer of a field emission material 104 disposed on the substrate 102, and, if necessary, an additional layer of an adhesion material (not shown) disposed between the substrate 102 and the field emission material 104. The substrate 102 may be made of an electrically conductive material, such as a metallic material, such as a solid metal or alloy (e.g., stainless steel, doped silicon), conductive glass (e.g., Indium Tin Oxide (ITO) coated glass or other fused glass having a conductive coating on the surface); or a conductive ceramic (e.g., a metalized ceramic, such as aluminum oxide, beryllium oxide, and aluminum nitride). The field emission material 104 includes a plurality of modified carbon nanotubes disposed within a matrix material. The layer of field emission material 104 is formed via deposition of the field emission material on to the substrate 102 by, for example a co-electrodeposition processing technique.

FIG. 2 illustrates a method 200 of forming a field emission material precursor including modified carbon nanotubes. In one aspect of the method, a liquid medium, such as water, is provided (step 210) into which a plurality of carbon nanotubes and a poly(3,4-ethylendioxythiophene)-poly(styrene sulfonic acid) (PEDOT:PSS) solution are introduced at a particular ratio (step 220). In some aspects, the particular ratio of carbon nanotubes to PEDOT:PSS solution ranging from 10:1 to 1:10. At step 230, the plurality of carbon nanotubes and the PEDOT:PSS solution are mixed via a strong ultrasonic dispersion process to form a base mixture. The mixing may be carried out at low frequency (20-50 kHz) and high power (>1 W/cm$^2$) for a period of time ranging from about 1 min to about 30 min. Next, at least one matrix particle, at least one metal salt, at least one charger or a combination thereof are introduced into the base mixture (step 240). The modified base mixture (i.e., with the inclusion of the at least one matrix particle, the at least one metal salt, and/or the at least one charger) is exposed to a mild ultrasonic dispersion process to form a stable suspension of the field emission material precursor (step 250). The mild ultrasonic dispersion process may be carried out at high frequency (>50 kHz) low power (<1 W/cm$^2$) and for a period of time ranging from about 30 minutes to about 24 hours. In various embodiments, the field emission material precursor may include the carbon nanotubes, the PEDOT:PSS, and the matrix particle(s); the carbon nanotubes, the PEDOT:PSS, and a metal salt; or the carbon nanotubes, the PEDOT:PSS, the matrix particle(s), and a charger; or variations thereof.

The specific composition and quantities of the components may vary to suit a particular application. For example, the base mixture may be modified by the addition of one or more matrix particle, one or more metal salt, one or more charger or a combination thereof. In some embodiments, the at least one matrix particle may be formed from commercially available glass particles that are processed via planetary ball milling to produce glass particles with a diameter of about 100 nm to about 3 micrometers, where the at least one matrix particle is dispersed into the base mixture at up to 10 wt % of total liquid medium of the field emission material precursor. Additionally, the at least one metal salt may be selected from the group consisting of a silver salt, a copper salt, a platinum salt, a bismuth salt, a tungsten salt, a stibium salt, a gold salt, or combinations thereof, where the at least one metal salt is dispersed into the base mixture at up to 10 wt % of total liquid medium of the field emission material precursor. The at least one charger may be selected from the group consisting of a lithium salt, a sodium salt, a calcium salt, a magnesium salt, an aluminum salt, a zinc salt, an iron salt, a cobalt salt, a nickel salt, an ammonium salt, or combinations thereof, where the at least one charger is dispersed into the base mixture at up to 1 wt % of total liquid medium of the field emission material precursor. The carbon nanotubes may be manufactured by a chemical vapor deposition process, a laser ablation process, and/or an arc discharge method.

Once the field emission material precursor has been created in a liquid suspension, the precursor may be deposited on to a substrate via a co-electrodeposition process (step 260) to provide the field emission composite film in a solid form on the substrate. The film may be subjected to one or more other processes after deposition on the substrate, such as drying, annealing and activating processes. The substrate may be made of a metal, a conductive glass, or a metalized ceramic. The substrate may be provided to the appropriate equipment via, for example, a robotic material handling system or manually by a user. The substrate is configured to receive a layer of the field emission material thereon.

FIG. 3 illustrates a method 300 of forming a field emission cathode using a field emission material comprising modified carbon nanotubes. In one aspect of the method, a substrate, such as those described hereinabove, is provided to equipment configured for carrying out a deposition process (step 310). The method further includes forming a field emission material (step 320). In some cases, the field emission material is created prior to the substrate being provided. A layer of the field emission material is deposited on to at least a portion of the substrate via a co-electrodeposition process (step 330). The anodic electrophoretic deposition of the plurality of carbon nanotubes modified by the PEDOT:PSS and the anodic electrodeposition of the matrix materials are simultaneously carried out via the co-electrodeposition process. The substrate may be made of a metal, an alloy, a conductive glass, or a metalized ceramic. The substrate may be provided to the appropriate equipment via, for example, a robotic material handling system or manually by a user.

The substrate and the layer of field emission material precursor deposited thereon is then exposed to a drying process (step 340) and an annealing process (step 350). The drying process may be carried out at a temperature of about 20° C. to about 150° C. at atmosphere or under a vacuum. The annealing process may be carried out at a temperature of about 300° C. to about 1000° C. under a vacuum. At step 360, the layer of the field emission material is activated to obtain the field emission cathode. Activation may be carried out by applying an adhesive (e.g., an adhesive tape or a curable adhesive material) on to a surface of the layer of the field emission material and removing the adhesive from the layer of the field emission material.

Steps 370a and 370b illustrates one example of a method of forming a field emission material precursor. At step 370a, a plurality of carbon nanotubes and a PEDOT:PSS solution are mixed into a liquid medium, such as water, at a particular ratio. In some aspects, the particular ratio of carbon nanotubes to PEDOT:PSS solution ranging from 10:1 to 1:10. The components can be mixed via a strong ultrasonic dispersion process to form a base mixture, as described hereinabove. Next, at least one matrix particle, at least one metal salt, at least one charger, or a combination thereof are dispersed within the base mixture (step 370b). The modified base mixture (i.e., with the inclusion of the at least one matrix particle, the at least one metal salt, and/or the at least one charger) can be exposed to a mild ultrasonic dispersion process to form a stable suspension of the field emission material precursor, as described hereinabove. In various embodiments, the field emission material precursor may include the carbon nanotubes, the PEDOT:PSS, and the matrix particle(s); the carbon nanotubes, the PEDOT:PSS, and a metal salt; or the carbon nanotubes, the PEDOT:PSS, the matrix particle(s), and a charger; or variations thereof.

The specific composition and quantities of the components may vary to suit a particular application. For example, the at least one matrix particle may be formed from commercially available glass particles that are processed via planetary ball milling to produce generally glass particles with a diameter of about 100 nm to about 3 micrometers, where the at least one matrix particle is dispersed into the base mixture at up to 10 wt % of total liquid medium of the field emission material precursor. Additionally, the at least one metal salt may be selected from the group consisting of a silver salt, a copper salt, a platinum salt, a bismuth salt, a tungsten salt, a stibium salt, a gold salt, or combinations thereof, where the at least one metal salt is dispersed into the base mixture at up to 10 wt % of total liquid medium of the field emission material precursor. The at least one charger may be selected from the group consisting of a lithium salt, a sodium salt, a calcium salt, a magnesium salt, an aluminum salt, a zinc salt, an iron salt, a cobalt salt, a nickel salt, an ammonium salt, or combinations thereof, where the at least one charger is dispersed into the base mixture at up to 1 wt % of total liquid medium of the field emission material precursor. The carbon nanotubes may be manufactured by a chemical vapor deposition process, a laser ablation process, and/or an arc discharge method.

The foregoing methods provide for a carbon nanotube/PEDOT:PSS/matrix layer in a nanometer composite structure, which is uniform in texture when formed on the surface of a substrate. After drying and annealing in a vacuum, a field emission cathode is activated. The obtained cathode has the characteristics of high emitter density, high emission current, low turn on voltage and long lifetime. The batch to batch variation of cathodes is significantly decreased, which is critical for industrialized production and application.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used hereinto describe various steps or That which is claimed:

1. A method of forming a field emission cathode, comprising:
   forming a field emission material, comprising:
   mixing a plurality of carbon nanotubes and a poly (3,4-ethylendioxythiophene)-poly (styrene sulfonic acid) (PEDOT: PSS) solution in water at a ratio to form a base mixture;
   exposing the base mixture to an ultrasonic dispersion process at a power of greater than 1 W/cm$^2$ and at a frequency of about 20-50 kHz;
   introducing at least one matrix particle, at least one metal salt, at least one charger, or a combination thereof to the base mixture to form a field emission material precursor, the at least one metal salt being different from the at least one charger; and
   exposing the field emission material precursor to an ultrasonic dispersion process at a power of less than 1 W/cm$^2$ and at a frequency of greater than 50 kHz to form the field emission material comprising a stable suspension of the field emission material precursor;
   depositing a layer of the field emission material on to at least a portion of a substrate via a co-electrodeposition process;
   drying the layer and the substrate at a temperature of about 20° C. to about 150° C. at atmosphere or under a vacuum;
   annealing the layer and the substrate at a temperature of about 300° C. to about 1000° C. under a vacuum; and
   activating the layer of the field emission material to obtain the field emission cathode.

2. The method of claim 1, wherein mixing the plurality of carbon nanotubes and the PEDOT: PSS solution comprises mixing the plurality of carbon nanotubes and the PEDOT: PSS solution such that the ratio of carbon nanotubes to PEDOT: PSS solution ranges from 10:1 to 1:10.

3. The method of claim 1, wherein introducing at least one matrix particle comprises introducing at least one glass particle.

4. The method of claim 3, wherein introducing at least one glass particle comprises introducing at least one glass particle having a diameter of between about 100 nm to about 3 micrometers.

5. The method of claim 3, wherein introducing at least one matrix particle comprises introducing at least one matrix particle such that the at least one matrix particle is dispersed in the base mixture at up to 10 wt % of total liquid medium of the field emission material precursor.

6. The method of claim 1, wherein introducing at least one metal salt comprises introducing at least one metal salt selected from the group consisting of a silver salt, a copper salt, a platinum salt, a bismuth salt, a tungsten salt, a stibium salt, a gold salt, or combinations thereof.

7. The method of claim 6, wherein introducing at least one metal salt comprises introducing at least one metal salt such that the at least one metal salt is dispersed in the base mixture at up to 10 wt % of total liquid medium of the field emission material precursor.

8. The method of claim 1, wherein introducing at least one charger comprises introducing at least one charger selected from the group consisting of a lithium salt, a sodium salt, a calcium salt, a magnesium salt, an aluminum salt, a zinc salt, an iron salt, a cobalt salt, a nickel salt, an ammonium salt, or combinations thereof.

9. The method of claim 8, wherein introducing at least one charger comprises introducing at least one charger such that the at least one charger is dispersed in the base mixture at up to 1 wt % of total liquid medium of the field emission material precursor.

10. The method of claim 1, wherein depositing the layer of the field emission material comprises depositing the layer of the field emission material on to the at least a portion of the substrate comprising a metal, an alloy, a glass, or a ceramic.

11. The method of claim 1, wherein activating the layer of the field emission material comprises:
   applying an adhesive tape on to a surface of the layer of the field emission material; and
   removing the adhesive tape from the layer of the field emission material.

12. The method of claim 1, wherein activating the layer of the field emission material comprises:
   applying a curable adhesive on to a surface of the layer of the field emission material;
   exposing the adhesive to a heat source or an ultraviolet light to cure the adhesive and form a layer of an adhesive film; and
   removing the layer of adhesive film from the layer of the field emission material.

13. A method of forming a field emission material, comprising:
   introducing a plurality of carbon nanotubes into a liquid medium;
   introducing a PEDOT: PSS solution into the liquid medium at a ratio to the plurality of carbon nanotubes;
   mixing the plurality of carbon nanotubes and the PEDOT: PSS solution via an ultrasonic dispersion process at a power of greater than 1W/cm2 and at a frequency of about 20-50 kHz to form a base mixture;
   introducing at least one matrix particle, at least one metal salt, at least one charger, or a combination thereof in the base mixture, the at least one metal salt being different from the at least one charger; and
   exposing the base mixture comprising the at least one matrix particle, the at least one metal salt, and the at least one charger to an ultrasonic dispersion process at a power of less than 1 W/cm$^2$ and at a frequency of greater than 50 kHz to form the field emission material comprising a stable suspension of a field emission material precursor.

14. The method of claim 13, wherein introducing the PEDOT: PSS solution into the liquid medium comprises introducing a PEDOT: PSS solution into the water with the ratio of carbon nanotubes to PEDOT: PSS solution ranging from 10:1 to 1:10.

15. The method of claim 13, comprising depositing the field emission material precursor on to a substrate via a co-electrodeposition process.

16. The method of claim 13, wherein introducing at least one matrix particle comprises introducing at least one glass particle.

17. The method of claim 13, wherein introducing at least one matrix particle comprises introducing at least one matrix particle such that the at least one matrix particle is dispersed in the base mixture up to 10 wt % of total liquid medium of the field emission material precursor.

18. The method of claim 13, wherein introducing at least one metal salt comprises introducing at least one metal salt selected from the group consisting of a silver salt, a copper salt, a platinum salt, a bismuth salt, a tungsten salt, a stibium salt, a gold salt, or combinations thereof.

19. The method of claim 13, wherein introducing at least one metal salt comprises introducing at least one metal salt such that the at least one metal salt is dispersed in the base mixture at up to 10 wt % of total liquid medium of the field emission precursor material.

20. The method of claim 13, wherein introducing at least one charger comprises introducing at least one charger selected from the group consisting of a lithium salt, a sodium salt, a calcium salt, a magnesium salt, an aluminum salt, a zinc salt, an iron salt, a cobalt salt, a nickel salt, an ammonium salt, or combinations thereof.

21. The method of claim 13, wherein introducing at least one charger comprises introducing at least one charger such that the at least one charger is dispersed in the base mixture at up to 1 wt % of total liquid medium of the field emission precursor material.

22. A method of forming a field emission cathode, comprising:
    depositing a layer of the field emission material of claim 13 on to at least a portion of a substrate via a co-electrodeposition process;
    drying the layer and the substrate at a temperature of about 20° C. to about 150° C. at atmosphere or under a vacuum;
    annealing the layer and the substrate at a temperature of about 300° C. to about 1000° C. under a vacuum; and
    activating the layer of the field emission material to obtain the field emission cathode.

23. The method of claim 22, wherein activating the layer of the field emission material comprises:
    applying an adhesive tape on to a surface of the layer of the field emission material; and
    removing the adhesive tape from the layer of the field emission material.

24. The method of claim 22, wherein activating the layer of the field emission material comprises:
    applying a curable adhesive on to a surface of the layer of the field emission material;
    exposing the adhesive to a heat source or an ultraviolet light to cure the adhesive and form a layer of an adhesive film; and
    removing the layer of adhesive film from the layer of the field emission material.

* * * * *